(12) United States Patent
Winborne et al.

(10) Patent No.: US 11,379,765 B2
(45) Date of Patent: Jul. 5, 2022

(54) OCCUPANCY PREDICTION USING REAL-TIME INFORMATION

(71) Applicant: Bank of America Corporation, Charlotte, NC (US)

(72) Inventors: Rita Jean Winborne, Charlotte, NC (US); Melissa Gordon Glenn, Charlotte, NC (US); Daniel J. August, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 17/104,196

(22) Filed: Nov. 25, 2020

(65) Prior Publication Data
US 2022/0164740 A1 May 26, 2022

(51) Int. Cl.
*G06Q 10/06* (2012.01)
*G06Q 20/22* (2012.01)
*G06V 20/52* (2022.01)
*G06Q 20/38* (2012.01)

(52) U.S. Cl.
CPC ... *G06Q 10/06312* (2013.01); *G06Q 10/0637* (2013.01); *G06Q 20/389* (2013.01); *G06V 20/53* (2022.01)

(58) Field of Classification Search
None
See application file for complete search history.

(56) References Cited

U.S. PATENT DOCUMENTS

| 5,978,769 | A | | 11/1999 | Brown et al. |
| 6,147,608 | A | * | 11/2000 | Thacker ............... G08B 7/06 340/331 |
| 6,222,191 | B1 | | 4/2001 | Myron et al. |
| 6,415,205 | B1 | | 7/2002 | Myron et al. |

(Continued)

FOREIGN PATENT DOCUMENTS

| CN | 101350138 A | * | 1/2009 |
| EP | 2553539 A1 | | 2/2013 |

(Continued)

OTHER PUBLICATIONS

Hong et al. "Ten Questions Concerning Occupant Behavior in Buildings: The Big Picture" (2017) (retrieved from https://simulationresearch.lbl.gov/sites/all/files/t_hong_-_report_-_ten_questions_concerning_occupant_behavior_in_buildings_-_the_big_picture.pdf) (Year: 2017).*

*Primary Examiner* — Sujay Koneru

(57) ABSTRACT

An occupancy tracking device configured to receive an occupancy status request from a user device that includes a location identifier for a first physical location. The device is further configured to identify a local management system that is associated with the first physical location. The device is further configured to receive one or more images of an interior space of the first physical location in response to sending an occupancy information request. The device is further configured to determine a current occupancy level for the first physical location based at least in part on the number of people present in the images of the first physical location. The device is further configured to determine an occupancy status for the first physical location based on a comparison between the current occupancy level and an occupancy threshold value and to send the occupancy status to the user device.

20 Claims, 3 Drawing Sheets

(56) References Cited

U.S. PATENT DOCUMENTS

| | | |
|---|---|---|
| 6,645,066 B2 | 11/2003 | Gutta et al. |
| 6,726,113 B2 | 4/2004 | Guo |
| 7,643,908 B2 | 1/2010 | Quirino et al. |
| 7,813,870 B2 | 10/2010 | Downs et al. |
| 7,918,406 B2 | 4/2011 | Rosen |
| 8,457,796 B2 | 6/2013 | Thind |
| 8,510,255 B2 | 8/2013 | Fadell et al. |
| 8,577,711 B2 | 11/2013 | Korecki et al. |
| 8,600,556 B2 | 12/2013 | Nesler et al. |
| 8,775,359 B2 | 7/2014 | Tomastik |
| 8,788,448 B2 | 7/2014 | Fadell et al. |
| 8,812,344 B1* | 8/2014 | Saurabh ............ G06Q 30/0201 705/7.29 |
| 8,981,651 B2 | 3/2015 | Askin et al. |
| 9,070,093 B2 | 6/2015 | Grbovic et al. |
| 9,082,202 B2 | 7/2015 | Kovesi et al. |
| 9,148,935 B2 | 9/2015 | Mohan et al. |
| 9,378,476 B1* | 6/2016 | Schwartz ........ G06Q 10/063116 |
| 9,456,183 B2 | 9/2016 | Brackney |
| 9,477,239 B2 | 10/2016 | Bergman et al. |
| 9,575,180 B2 | 2/2017 | Miller et al. |
| 9,618,918 B2 | 4/2017 | O'Keeffe |
| 9,703,274 B2 | 7/2017 | Li |
| 10,659,737 B2* | 5/2020 | Ryan ..................... G06V 10/143 |
| 10,762,455 B1* | 9/2020 | Sager ............ G06Q 10/063116 |
| 11,068,937 B1* | 7/2021 | Fontana ............. G06Q 30/0267 |
| 2002/0175211 A1* | 11/2002 | Dominquez ............ G07C 1/10 235/492 |
| 2003/0096572 A1 | 5/2003 | Gutta |
| 2005/0146429 A1 | 7/2005 | Spoltore et al. |
| 2005/0192915 A1 | 9/2005 | Ahmed et al. |
| 2008/0004933 A1* | 1/2008 | Gillespie ........ G06Q 10/063112 705/7.14 |
| 2008/0016018 A1* | 1/2008 | Malik ..................... H04W 8/18 706/46 |
| 2009/0300174 A1* | 12/2009 | Floris .................... G06Q 10/06 715/764 |
| 2010/0198609 A1* | 8/2010 | Mellin ................... G06Q 10/00 705/2 |
| 2010/0299116 A1 | 11/2010 | Tomastik et al. |
| 2011/0066449 A1* | 3/2011 | Backhaus ............... G16H 40/20 705/2 |
| 2011/0160881 A1 | 6/2011 | Grey |
| 2011/0231419 A1* | 9/2011 | Papke ................... G06F 16/784 707/756 |
| 2012/0072030 A1 | 3/2012 | Elliot |
| 2012/0116789 A1* | 5/2012 | Boss ..................... G06Q 10/06 705/500 |
| 2012/0299728 A1 | 11/2012 | Kirkpatrick et al. |
| 2012/0310376 A1 | 12/2012 | Krumm et al. |
| 2013/0073094 A1 | 3/2013 | Knapton et al. |
| 2013/0289952 A1 | 10/2013 | Marwah et al. |
| 2014/0005916 A1 | 1/2014 | Shen et al. |
| 2014/0122174 A1* | 5/2014 | Hughes ............ G06Q 30/0202 705/7.31 |
| 2014/0136458 A1 | 5/2014 | Levin et al. |
| 2014/0277763 A1 | 9/2014 | Ramachandran et al. |
| 2014/0282792 A1 | 9/2014 | Bao et al. |
| 2015/0066861 A1* | 3/2015 | Ritto ...................... G06F 16/21 707/661 |
| 2015/0199575 A1* | 7/2015 | Dudovich ............. G06F 16/51 382/103 |
| 2015/0262085 A1* | 9/2015 | Mader ................ G06Q 30/0641 705/5 |
| 2015/0308706 A1 | 10/2015 | Bunker et al. |
| 2016/0065732 A1* | 3/2016 | Davis ..................... H04M 3/51 379/265.02 |
| 2016/0138824 A1 | 5/2016 | Patel et al. |
| 2016/0162910 A1* | 6/2016 | Pradhan ......... G06Q 10/063118 705/7.23 |
| 2016/0183037 A1 | 6/2016 | Grohman |
| 2017/0001306 A1 | 1/2017 | Grohman |
| 2017/0074541 A1 | 3/2017 | Bentz et al. |
| 2017/0103374 A1* | 4/2017 | Bhattacharjee ........ G06Q 20/32 |
| 2017/0149976 A1 | 5/2017 | Conway et al. |
| 2017/0293985 A1* | 10/2017 | Deria ..................... G06Q 50/14 |
| 2017/0295476 A1* | 10/2017 | Webb ..................... H04W 4/12 |
| 2017/0351981 A1* | 12/2017 | Senci ................. G06Q 30/0201 |
| 2018/0011463 A1 | 1/2018 | Chowdhury |
| 2019/0043002 A1* | 2/2019 | King ........................ G06F 9/541 |
| 2019/0102709 A1* | 4/2019 | Correa .................... H04L 51/32 |
| 2019/0171178 A1* | 6/2019 | Burke .................... G06V 20/52 |
| 2020/0058039 A1* | 2/2020 | Russo ................... G06Q 10/00 |
| 2020/0226363 A1* | 7/2020 | Holliday ................ G06K 9/627 |
| 2020/0228759 A1* | 7/2020 | Ryan ..................... H04N 7/188 |
| 2020/0327315 A1* | 10/2020 | Mullins .................. H04N 7/181 |
| 2020/0394584 A1* | 12/2020 | Walsh ............ G06Q 10/063114 |
| 2021/0027402 A1* | 1/2021 | Davis ................... G06Q 50/163 |
| 2021/0027485 A1* | 1/2021 | Zhang ................... G06K 9/3233 |
| 2021/0073609 A1* | 3/2021 | Mohanty ................ G06M 1/22 |
| 2021/0117693 A1* | 4/2021 | Martin ................... G06T 7/246 |
| 2021/0150421 A1* | 5/2021 | Abbe ................... G06F 9/44521 |
| 2021/0201244 A1* | 7/2021 | Sella ................... H04M 3/42382 |
| 2021/0374430 A1* | 12/2021 | Siemer .................. G06V 20/46 |

FOREIGN PATENT DOCUMENTS

| | | |
|---|---|---|
| EP | 2709080 A1 | 3/2014 |
| WO | 2013133967 A1 | 9/2013 |
| WO | 2014041350 A1 | 3/2014 |
| WO | 2014149257 A1 | 9/2014 |
| WO | 2016165742 A1 | 10/2016 |

* cited by examiner

OCCUPANCY PREDICTION USING REAL-TIME INFORMATION

TECHNICAL FIELD

The present disclosure relates generally to occupancy prediction, and more specifically to occupancy prediction using real-time information.

BACKGROUND

When a large number of people visit a physical location (e.g. a store), the available resources (e.g. processing resources and network resources) of the physical location become reduced to handle the large volume of requests by the visitors. This reduction in available resources limits the throughput of the physical location which may cause delays, downtime, and long wait times. Existing systems lack the ability to manage the resources of the physical location based on the current occupancy of the physical location. The reason for this is because existing systems are unable to accurately determine or to predict the current occupancy level of a physical location. Determining the number of people at a physical location poses a technical challenge to existing computer systems because the number of people that visit a physical location varies by location and also varies throughout the day.

SUMMARY

The system disclosed in the present application provides a technical solution to the technical problems discussed above by providing real-time occupancy statuses for a physical location based on the current activity level of the physical location. The disclosed system provides several practical applications and technical advantages which include a process for determining or predicting the current occupancy status for a physical location based on current images of the physical location, staffing information for the physical location, data flow information (e.g. network traffic) for the physical location, or any other suitable type of information that is associated with the physical location. By providing real-time occupancy statuses for the physical location, the occupancy tracking system is able to manage the number of people that visit the physical location by notifying users when the physical location is busy. This process prevents additional people from visiting a physical location when the physical location is already overutilizing its available resources. By managing the number of people that visit the physical location, the occupancy tracking system is able to manage the resource utilization of the physical location. This process improves the resource utilization and throughput of the physical location and reduces delays and wait times.

In one embodiment, the system comprises an occupancy tracking device configured to receive an occupancy status request from a user device. The occupancy status request includes a location identifier that identifies a physical location where services are provided. Examples of the physical location include, but are not limited to, offices, stores, banks, businesses, restaurants, gyms, and any other suitable type of location. The device is further configured to identify the physical location that is associated with the location identifier and to identify a local management system that is associated with the physical location. The local management system is configured to collect information that is associated with the current activity at the physical location. The device is further configured to send an occupancy information request to the local management system and to receive occupancy data in response to sending the occupancy information request. The occupancy data may include images of an interior space of the physical location and any other additional information that is associated with the current activity of the physical location. The device is further configured to determine a current occupancy level for the physical location based at least in part on a number of people present in the images. The device is further configured to compare the current occupancy level to an occupancy threshold value and to determine an occupancy status for the physical location based on the comparison. The occupancy status indicates how busy the physical location is currently. The occupancy status also corresponds with the amount of resources that are currently available at the physical location. By managing the number of people that visit the physical location, the occupancy tracking system is able to manage the resource utilization of the physical location. This process improves the resource utilization and throughput of the physical location and reduces delays and wait times.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
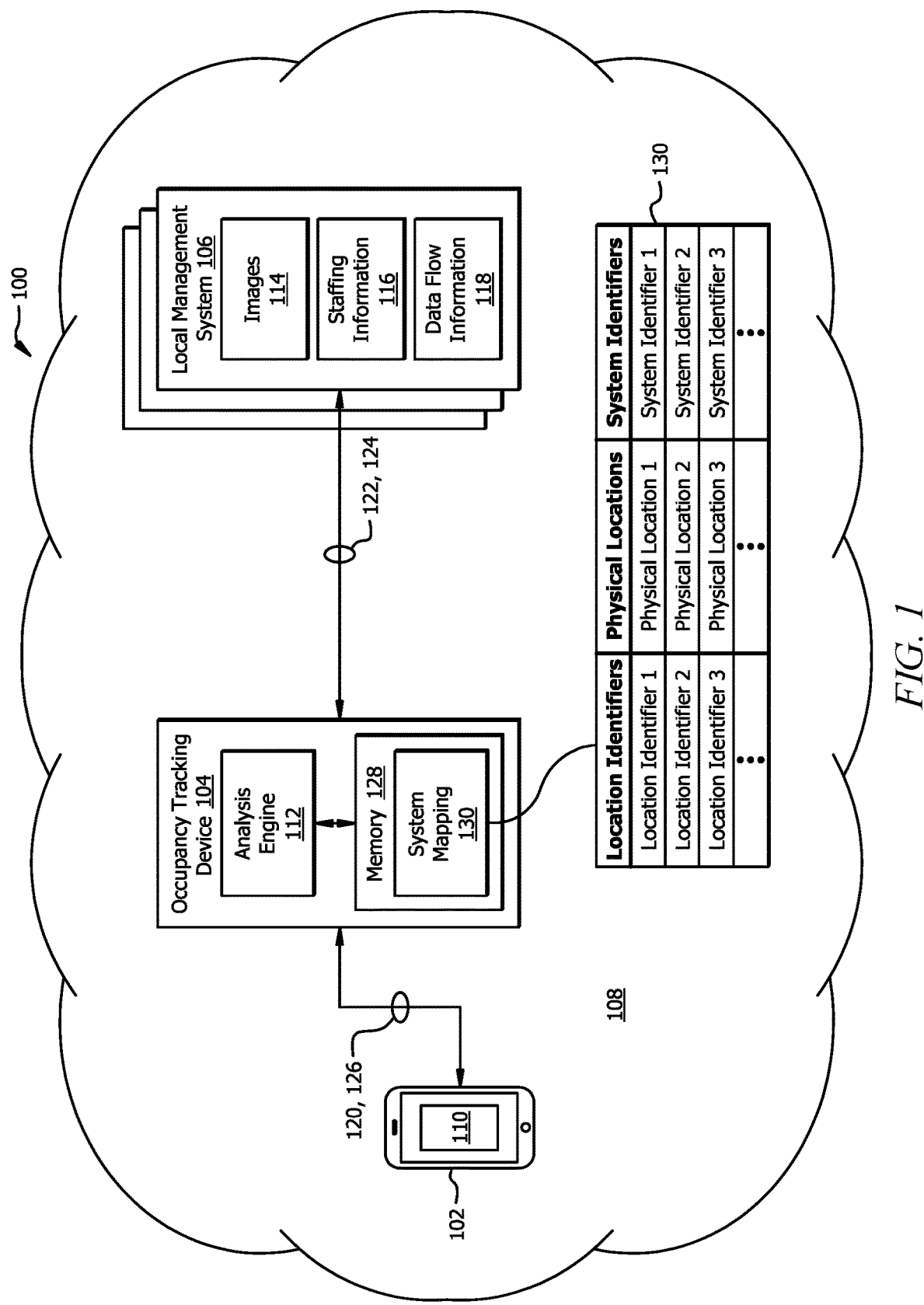
FIG. 1 is a schematic diagram of an embodiment of an occupancy tracking system.

FIG. 1 is a schematic diagram of an embodiment of an occupancy tracking system 100. The occupancy tracking system 100 is generally configured to provide real-time occupancy statuses 126 for a physical location based on the current activity level of the physical location. The occupancy tracking system 100 may determine or predict the current occupancy status 126 for the physical location based on current images 114 of the physical location, staffing information 116 for the physical location, data flow information 118 (e.g. network traffic) for the physical location, or any other suitable type of information that is associated with the physical location. By providing real-time occupancy statuses 126 for the physical location, the occupancy tracking system 100 is able to manage the number of people that visit the physical location. When a large number of people visit a physical location (e.g. a store), the processing resources and the network resources of the physical location become reduced to handle the large volume of people. The reduced number of available resources limits the throughput of the physical location and may result in overutilization of the resources that are available at the physical location. By managing the number of people that visit the physical location, the occupancy tracking system 100 is able to manage the resource utilization of the physical location. This process improves the resource utilization and throughput of the physical location and reduces delays and wait times.

In one embodiment, the system 100 comprises one or more user devices 102, an occupancy tracking device 104, and one or more local management systems 106 that are in signal communication with each other over a network 108. In FIG. 1, the occupancy tracking device 104 and the local management system 106 are shown as two discrete devices. In this example, the occupancy tracking device 104 may be an external device or a remote device (e.g. a remote server or a cloud server) from the local management system 106. In some embodiments, the occupancy tracking device 104 and the local management system 106 may be integrated within a single device. For example, a local management system 106 may be configured to perform the functionality of the occupancy tracking device 104. As another example, the occupancy tracking device 104 may be a device that is installed within a local management system 106.

The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

User Device

Examples of user devices 102 include, but are not limited to, a mobile phone, a smartphone, a tablet, a laptop, a computer, and a wearable device. The user device 102 may comprise any suitable type of wireless communication hardware interface for communicating with an occupancy tracking device 104 and a local management system 106. The user device 102 comprises an application 110 that enables the user device 102 to send requests and to receive information (e.g. occupancy statuses 126) from the occupancy tracking device 104. For example, the user device 102 may use the application 110 to send an occupancy status request 120 to the occupancy tracking device 104. In response to sending the occupancy status request 120 to the occupancy tracking device 104, the user device 102 will receive an occupancy status 126 from the occupancy tracking device 104 that indicates the current occupancy of the physical location. An example of the user device 102 in operation is described in FIG. 2.

Local Management System

Examples of a local management system 106 include, but are not limited to, computers, servers, or any other suitable type of network device. The local management system 106 may comprise any suitable type of wireless communication hardware interface for communicating with a user device 102 and the occupancy tracking device 104. Each local management system 106 is uniquely associated with a particular physical location. Examples of physical locations include, but are not limited to, offices, stores, banks, businesses, restaurants, gyms, and any other suitable type of location.

The local management system 106 is generally configured to collect information about the activity at a physical location. For example, a local management system 106 may comprise a camera system (e.g. a surveillance system) that is configured to capture images 114 of a physical location. For instance, the local management system 106 may comprise a plurality of cameras that are configured to capture images 114 of an interior and/or an exterior of a physical location. In this example, the local management system 106 uses the camera system to capture images 114 of the people (e.g. employees and customers) that are currently located at a physical location. As another example, the local management system 106 is configured to collect staffing information 116 about a physical location. Examples of staffing information 116 include, but are not limited to, employee log-in information, employee scheduling information, or any other suitable type of information about the staffing of the physical location. As another example, the local management system 106 is configured to collect data flow information 118 for a physical location. Examples of data flow information 118 include, but are not limited to, hardware utilization, network utilization, network traffic information, phone traffic information, transaction information, or any other suitable type of data information for the physical location. In other examples, the local management system 106 may be configured to collect any other suitable type of information that is associated with the activity of the physical location.

Occupancy Tracking Device

The occupancy tracking device 104 is generally configured to receive an occupancy status request 120 for an occupancy status 126 for a physical location (e.g. a business) from a user device 102, to determine an occupancy status 126 for the physical location based on the current activity of the physical location, and to output the occupancy status 126 to the user device 102. An example of the occupancy tracking device 104 in operation is described below in FIG. 2.

Examples of an occupancy tracking device 104 include, but are not limited to, computers, servers, or any other suitable type of networking device. The occupancy tracking device 104 comprises an analysis engine 112 and a memory 128. Additional details about the occupancy tracking device 104 are described in FIG. 3. The analysis engine 112 is generally configured to request information about the activity of a physical location from a local management system 106 and to determine an occupancy status 126 for the physical location based on the current activity of the physical location. An example of the analysis engine 112 in operation is described in FIG. 2.

The memory 128 is configured to store a system mapping 130 and/or any other suitable type of data. A system mapping 130 is configured to link a physical location with a location identifier and a system identifier. The location identifier may be an address, a Global Positioning System (GPS) coordinate, a location name, or any other suitable type of identifier that uniquely identifies a physical location. The system identifier is an identifier (e.g. an alphanumeric identifier) that uniquely identifies a local management system 106 that is associated with a physical location. In some embodiments, the system identifier may also provide information about how to access or communicate with the local management system 106. For example, the system identifier may be an Internet Protocol (IP) address, a Media Access Control (MAC) address, a Uniform Record Locator (URL) address, a File Transfer Protocol (FTP) address, or any other suitable type of identifier for the local management system 106.

Occupancy Prediction Process

Figure 2:
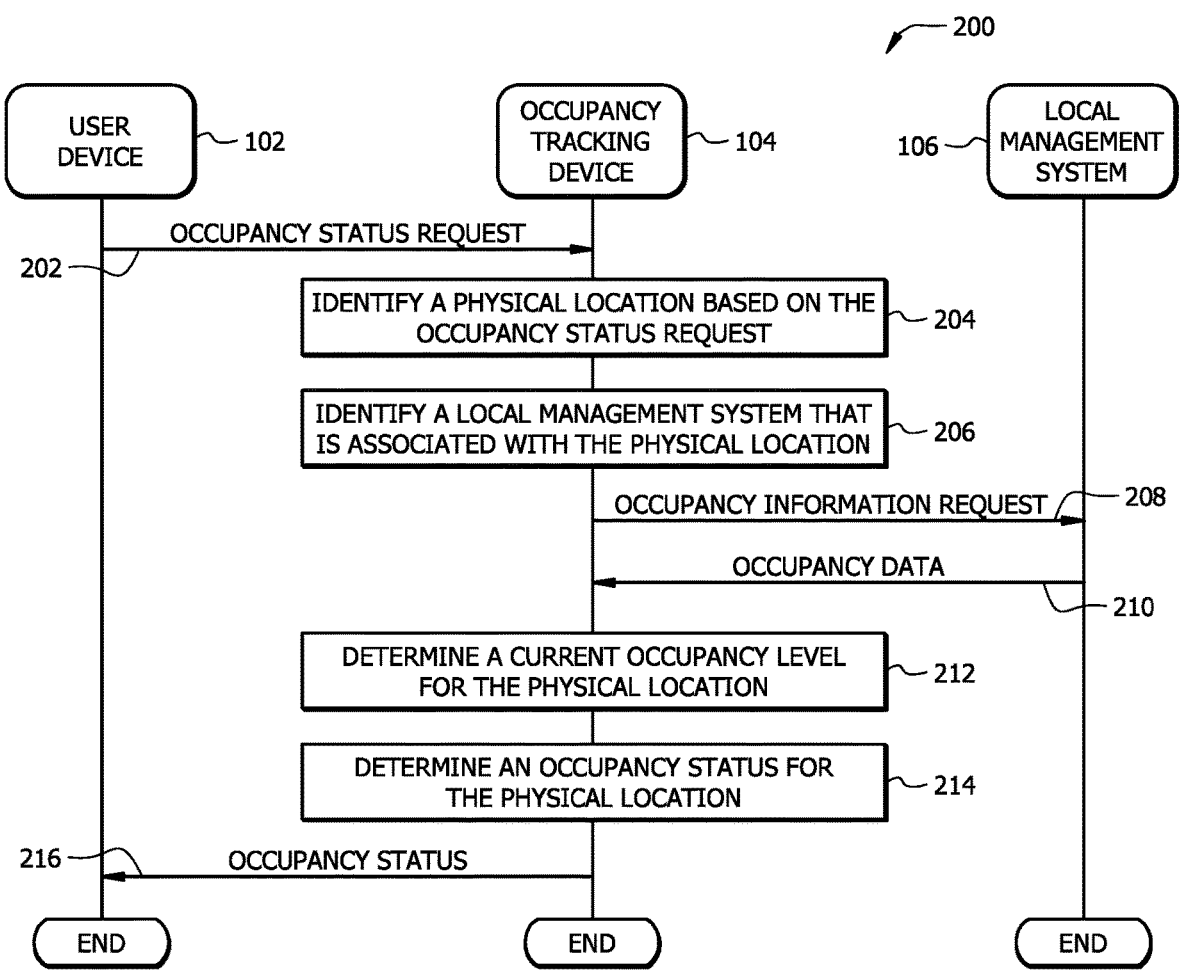
FIG. 2 is a protocol diagram of an embodiment of an occupancy prediction process for the occupancy tracking system.

FIG. 2 is a protocol diagram of an embodiment of an occupancy prediction process 200 for the occupancy tracking system 100. The occupancy tracking system 100 may employ process 200 to determine or predict the current occupancy status 126 for the physical location based on current images 114 of the physical location, staffing information 116 for the physical location, data flow information 118 (e.g. network traffic) for the physical location, or any other suitable type of information that is associated with the physical location. By managing the number of people that visit the physical location, the occupancy tracking system 100 is able to manage the resource utilization of the physical location. This process improves the resource utilization and throughput of the physical location and reduces delays and wait times.

At step 202, the user device 102 sends an occupancy status request 120 to the occupancy tracking device 104. For example, a user may use the application 110 on their user device 102 to send the occupancy status request 120 to the occupancy tracking device 104. In one embodiment, the occupancy status request 120 comprises a location identifier that uniquely identifies a physical location. In some embodiments, the occupancy status request 120 may further comprise a service identifier. The service identifier may be an alphanumeric identifier that uniquely identifies a service or product that is offered at the physical location. In some embodiments, the occupancy status request 120 may further comprise a time identifier that identifies a user-selected day and/or time. For example, the user may use the time identifier to request the occupancy status 126 for the physical location at a particular time in the future. In other embodiments, the occupancy status request 120 may further comprise any other suitable type or combination of information.

At step 204, the occupancy tracking device 104 identifies a physical location based on the occupancy status request 120. Here, the occupancy tracking device 104 uses the location identifier from the occupancy status request 120 to identify a physical location that corresponds with the location identifier. For example, the occupancy tracking device 104 may use the location identifier as a search token to identify the physical location using the system mapping 130.

At step 206, the occupancy tracking device 104 identifies a local management system 106 that is associated with the physical location. The occupancy tracking device 104 may once again use the system mapping 130 to identify a system identifier for the local management system 106 that is associated with the physical location and the location identifier.

At step 208, the occupancy tracking device 104 sends an occupancy information request 122 to the local management system 106. The occupancy tracking device 104 sends the occupancy information request 122 to request information about the current activity level of the physical location that is associated with the local management system 106. In one embodiment, the system identifier may provide information about how the occupancy tracking device 104 can access or communicate with the local management system 106. In this example, the occupancy tracking device 104 uses the system identifier (e.g. an IP address and/or a MAC address) for local management system 106 to access or send an occupancy information request 122.

At step 210, the occupancy tracking device 104 receives occupancy data 124 from the local management system 106. The occupancy data 124 may comprise a combination of images 114, staffing information 116, data flow information 118, or any other suitable type of information about the activity of the physical location.

At step 212, the occupancy tracking device 104 determines a current occupancy level for the physical location based on the occupancy data 124 from the local management system 106. The occupancy tracking device 104 may use any combination of information from the occupancy data 124 to determine a current occupancy level for the physical location. The occupancy level is a numeric value that corresponds with the occupancy of the physical location. As an example, the occupancy level may correspond with the total number of people that are present at the physical location. As another example, the occupancy level may correspond with the total number of customers that are present at the physical location. As another example, the occupancy level may correspond with the total number of employees that are present at the physical location. In other examples, the occupancy level may correspond with any other suitable type of occupancy for the physical location.

In one embodiment, the occupancy tracking device 104 may determine the current occupancy level for the physical location based on images 114 of the physical location. For example, the occupancy tracking device 104 apply one or more image processing techniques to the images 114 of the physical location to determine the number of people that are present in the images 114. The occupancy tracking device 104 may apply any suitable type of image processing techniques for detecting people within the images 114. In this example, the current occupancy level for the physical location may correspond with the number of people that are present in the images 114.

In some examples, the occupancy tracking device 104 may further refine the current occupancy level to reflect just the number of customers that are present in the physical location. For instance, the occupancy data 124 may comprise staffing information 116 that includes employee log-in records. The employee log-in records may indicate which employees are present at the physical location based on the employees using their badge, access card, or any other suitable type credentials for reporting to work. In this example, employees may provide one or more credentials when they log-in for work. The occupancy tracking device 104 may then determine the number of employees that are present at the physical location. The occupancy tracking device 104 may subtract the number of employees that are present from the total number of people that were detected based on the images 114 of the physical location to determine the number of customers that are present at the physical location. In this example, the current occupancy level for the physical location corresponds with the number of customers that are present at the physical location.

In some embodiments, the occupancy tracking device 104 may determine the current occupancy level for the physical location based on data flow information 118 for the physical location. As an example, the data flow information 118 may comprise transaction history for the physical location. In this example, the occupancy tracking device 104 may determine the number of transactions within a predetermined time period. The predetermined period of time may be a time period within the last five minutes, the last thirty minutes, the last hour, or any other suitable time period. The occupancy tracking device 104 may compare the number of transactions within the predetermined time period to a transaction threshold value. The transaction threshold value in this example corresponds with an average number of transactions for the physical location during the predetermined time period. The occupancy tracking device 104 then determines the occupancy level based on the comparison. For instance, the occupancy tracking device 104 may assign a first numeric value to the occupancy level when the number of transactions within the predetermined time period is greater than or equal to the transaction threshold value. The occupancy tracking device 104 may assign a second numeric value to the occupancy level when the number of transactions within the predetermined time period is less than the transaction threshold value. In other examples, the occupancy tracking device 104 may perform a similar process using network traffic, network bandwidth, resource utilization, processor utilization, memory utilization, or any other suitable type of data flow information 118.

In some embodiments, the occupancy tracking device 104 may determine the current occupancy level for the physical location for a particular user-selected time. For example, the occupancy status request 120 may comprise a time identifier that identifies a user-selected time in the future. The occupancy tracking device 104 may also receive occupancy data 124 that comprises staffing information 116 that identifies a number of employees that will be present at the physical location at various times of the day. In this example, the occupancy tracking device 104 may determine the number of employees that are scheduled to be present at the user-selected time based on the staffing information 116. The occupancy tracking device 104 may then determine the occupancy level based on the number of employees that are scheduled to be present at the user-selected time. For example, the occupancy tracking device 104 may assign a lower occupancy level when there are a greater number of employees scheduled to be present at the user-selected time. The occupancy tracking device 104 may assign a higher occupancy level when there are a fewer number of employees scheduled to be present at the user-selected time.

In some embodiments, the occupancy tracking device 104 may determine the current occupancy level for the physical location based on a particular type of service that a user is interested in. For example, the occupancy status request 120 may comprise a service identifier that identifies a service or product that is offered at the physical location. The occupancy tracking device 104 may also receive occupancy data 124 that comprises staffing information 116 that includes employee log-in records. In this example, the occupancy tracking device 104 may determine the number of employees that are present at the physical location and that are associated with the identified service based on the employee log-in records. The occupancy tracking device 104 may then determine the current occupancy level based on the number of employees that are present at the physical location and that are associated with the identified service. For example, the occupancy tracking device 104 may assign a lower occupancy level when there are a greater number of employees associated with the service are present at the physical location. The occupancy tracking device 104 may assign a higher occupancy level when there are a fewer number of employees associated with the service are present at the physical location. In some examples, the occupancy tracking device 104 may determine the number of employees associated with the service at a user-selected time using a process similar to the process described above. For instance, the occupancy tracking device 104 may determine the number of employees that are associated with the service that will be present at the physical location at the user-selected time.

In other embodiments, the occupancy tracking device 104 may use any other suitable combination of images 114, staffing information 116, and data flow information 118 for determining an occupancy level for the physical location.

At step 214, the occupancy tracking device 104 determines an occupancy status 126 for the physical location. The occupancy status 126 provides a qualitative value that corresponds with the current occupancy level of the physical location. In other words, the occupancy status 126 converts the numeric value of the current occupancy level to a qualitative value that can be more readily understood by a user. The occupancy status 126 may use text descriptors (e.g. high, normal, low), color descriptors (e.g. red, yellow, green), or any other suitable type of descriptor. The occupancy status 126 may also corresponds with the current resource utilization, wait time, and/or demand at the physical location. As an example, an occupancy status 126 that indicates a low occupancy may correspond with low wait times or low resource utilization at the physical location. An occupancy status 126 that indicates a normal occupancy may correspond with average wait times or average resource utilization at the physical location. An occupancy status 126 that indicates a high occupancy may correspond with a high wait time or high resource utilization at the physical location.

In one embodiment, the occupancy tracking device 104 uses one or more occupancy threshold values to determine an occupancy status 126. An occupancy threshold value is a numeric value that can be used to classify an occupancy level. An example, the occupancy tracking device 104 may compare an occupancy level to an occupancy threshold value to determine whether the occupancy level corresponds to a low occupancy or a high occupancy. In this example, the occupancy tracking device 104 may determine that the occupancy level corresponds with an occupancy status 126 of low occupancy when the occupancy level is less than the occupancy threshold value. The occupancy tracking device 104 may determine that the occupancy level corresponds with an occupancy status 126 of high occupancy when the occupancy level is greater than or equal to the occupancy threshold value. The occupancy tracking device 104 may repeat the process of comparing the current occupancy level to one or more additional occupancy threshold values to provide a finer granularity for the occupancy status 126 of the physical location.

At step 216, the occupancy tracking device 104 sends the occupancy status 126 to the user device 102. The occupancy tracking device 104 may send the occupancy status 126 as an alert, an application notification, a text message (e.g. a Short Message Service (SMS) message), or using any other suitable type of message. After receiving the occupancy status 126, the user device 102 may present the occupancy status 126 to the user using a graphical user interface (e.g. application 110). This process allows the user device 102 to obtain a real-time occupancy status 126 for the physical location based on the current activity level at the physical location.

In some embodiments, the occupancy tracking device 104 may also be configured to output the occupancy status 126 to other recipients. For example, the occupancy tracking device 104 may output the current occupancy status 126 to a manager at the physical location. In this example, the occupancy tracking device 104 may output the occupancy status 126 to the manager to notify the manager to take appropriate actions based on the current occupancy status 126. For instance, the manager may adjust (e.g. increase or decrease) staffing and/or resources based on the current occupancy status 126.

In some embodiments, the occupancy tracking device 104 may be configured to continue to monitor the occupancy status 126 for the physical location and to notify the user device 102 when the occupancy status 126 falls below a predetermined threshold value. For example, the user device 102 may initially receive a current occupancy status 126 that indicates that the physical location is busy or overutilized. The occupancy tracking device 104 may continue to update the current occupancy status 126 and may send a notification to the user device 102 when the occupancy status 126 indicates that the physical location is no longer busy or overutilized. The occupancy tracking device 104 may send the notification as an alert, an application notification, a text message (e.g. an SMS message), or using any other suitable type of message.

In some embodiments, the occupancy tracking device 104 may be configured to provide the user device 102 with a recommended alternative time for visiting the physical location. For example, the current occupancy status 126 may indicate that the physical location is busy or overutilized which means that the user will experience longer than usual wait times. In this case, the occupancy tracking device 104 may be further configured to determine a different time for the user when the physical location is less busy and more resource are available. In this case, the occupancy tracking device 104 may identify an alternative time (e.g. a future time) that is different from the current time or a user-selected time. The occupancy tracking device 104 may then determine the number of employees that are associated with a service that is offered at the physical location at the alternative time and a corresponding occupancy level using a process similar to the process described in step 212. The occupancy tracking device 104 compares the determined occupancy level to the current occupancy level. When the determined occupancy level is greater than or equal to the current occupancy level, the occupancy tracking device 104 selects a new alternative time and repeats the process of determining an occupancy level for the new alternative time. When the determined occupancy level is less than the current occupancy level, the occupancy tracking device 104 may generate and send a recommendation to the user device that identifies the alternative time for visiting the physical location. In some embodiments, the occupancy tracking device 104 may include the occupancy status for the alternative time with the recommendation. The occupancy tracking device 104 may send the occupancy status 126 as an alert, an application notification, a text message (e.g. an SMS message), or using any other suitable type of message.

Hardware Configuration for an Occupancy Tracking Device

Figure 3:
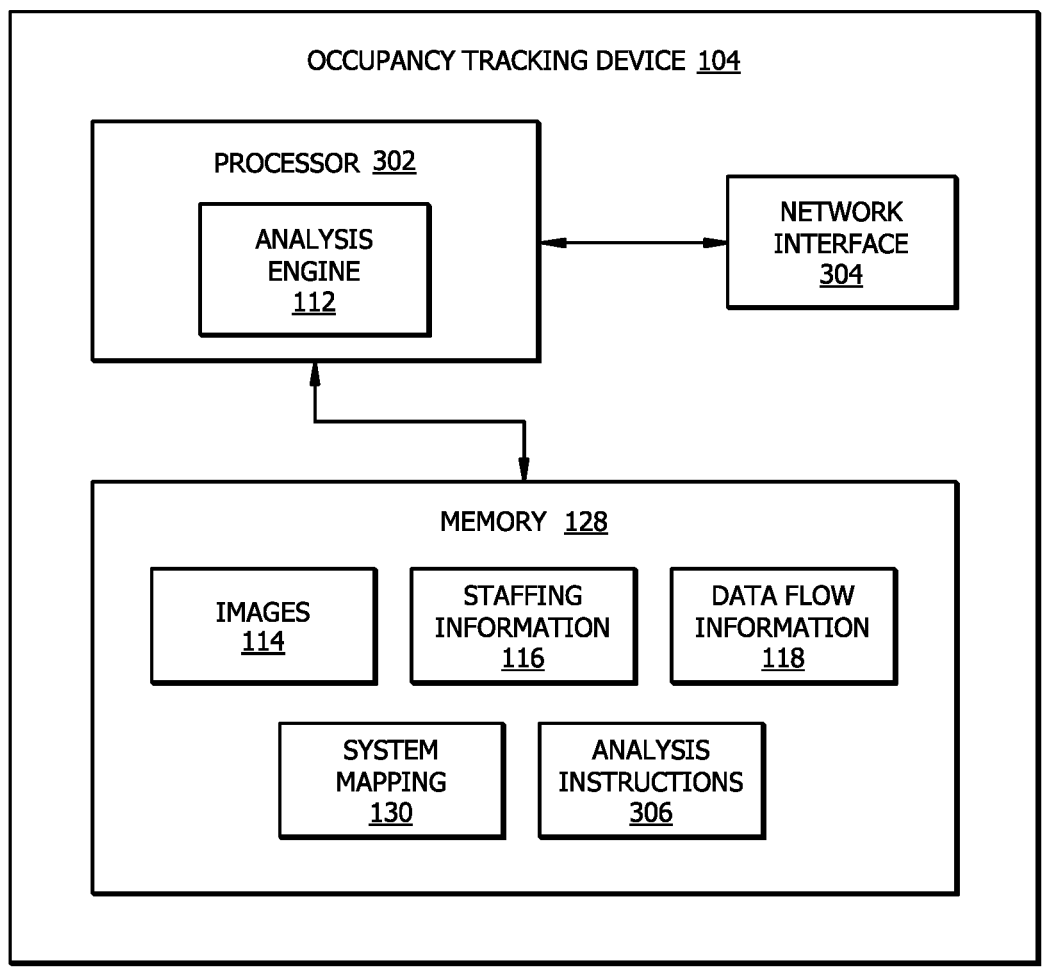
FIG. 3 is an embodiment of an occupancy tracking device for the occupancy tracking system.

FIG. 3 is an embodiment of a device (e.g. an occupancy tracking device 104) of an occupancy tracking system 100. As an example, the occupancy tracking device 104 comprises a processor 302, a memory 128, and a network interface 304. The occupancy tracking device 104 may be configured as shown or in any other suitable configuration.

Processor

The processor 302 comprises one or more processors operably coupled to the memory 128. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 128. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute analysis instructions 306 to implement the analysis engine 112. In this way, processor 302 may be a special-purpose computer designed to implement the functions disclosed herein. In an embodiment, the analysis engine 112 is implemented using logic units, FPGAs, ASICs, DSPs, or any other suitable hardware. The analysis engine 112 is configured to operate as described in FIGS. 1-2. For example, the analysis engine 112 may be configured to perform the steps of process 200 as described in FIG. 2.

Memory

The memory 128 is operable to store any of the information described above with respect to FIGS. 1-2 along with any other data, instructions, logic, rules, or code operable to implement the function(s) described herein when executed by the processor 302. The memory 128 comprises one or more disks, tape drives, or solid-state drives, and may be used as an over-flow data storage device, to store programs when such programs are selected for execution, and to store instructions and data that are read during program execution. The memory 128 may be volatile or non-volatile and may comprise a read-only memory (ROM), random-access memory (RAM), ternary content-addressable memory (TCAM), dynamic random-access memory (DRAM), and static random-access memory (SRAM).

The memory 128 is operable to store analysis instructions 306, a system mapping 130, images 114, staffing information 116, data flow information 118, and/or any other data or instructions. The analysis instructions 306 may comprise any suitable set of instructions, logic, rules, or code operable to execute the analysis engine 112. The system mapping 130, the images 114, the staffing information 116, and the data flow information 118 are configured similar to the system mapping 130, the images 114, the staffing information 116, and the data flow information 118 described in FIGS. 1-2.

Network Interface

The network interface 304 is configured to enable wired and/or wireless communications. The network interface 304 is configured to communicate data between the occupancy tracking device 104 and other devices (e.g. user devices 102 and local management systems 106), systems, or domains. For example, the network interface 304 may comprise an NFC interface, a Bluetooth interface, Zigbee interface, a Z-wave interface, an RFID interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An occupancy tracking device, comprising:
   a network interface configured to exchange data with a plurality of local management systems, wherein each local management system is associated with a physical location where services are provided; and
   a processor operably coupled to the network interface, configured to:
      receive an occupancy status request from a user device, wherein the occupancy status request comprises a location identifier for a first physical location;
      identify the first physical location that is associated with the location identifier;
      identify a local management system that is associated with the first physical location;
      send an occupancy information request to the local management system;
      receive occupancy data in response to sending the occupancy information request, wherein the occupancy data comprises one or more images of an interior space of the first physical location;
      determine a current occupancy level for the first physical location based at least in part on a number of people present in the one or more images;
      compare the current occupancy level to an occupancy threshold value;
      determine an occupancy status for the first physical location based on the comparison between the current occupancy level and the occupancy threshold value, wherein determining the occupancy status for the first physical location comprises:
         determining to which occupancy class the current occupancy level belongs such that:
            in response to determining that the current occupancy level is more than the occupancy threshold level, determining that the current occupancy level belongs to a first occupancy class; and
            in response to determining that the current occupancy level is less than the occupancy threshold level, determining that the current occupancy level belongs to a second occupancy class;
      determine resource utilization employed at the physical location, wherein the resource comprises at least one of processing resources and network resources, wherein the resource utilization is proportional to the occupancy status such that:
         when the occupancy status is less than the occupancy threshold level, the resource utilization is less than a resource utilization threshold; and
         when the occupancy status is more than the occupancy threshold level, the resource utilization is more than the resource utilization threshold;
      manage an amount of the resource to be employed at the physical location based at least in part upon the occupancy status such that:
         when the occupancy status is less than the occupancy threshold level, the amount of resources is reduced; and
         when the occupancy status is more than the occupancy threshold level, the amount of resources is increased; and
      send the occupancy status to the user device.

2. The device of claim 1, wherein:
   the occupancy data comprises employee log-in records; and
   determining the current occupancy level comprises:
      determining a number of employees that are present at the first physical location based on the employee log-in records; and
      subtracting the number of employees that are present at the first physical location from the number of people that are present in the one or more images.

3. The device of claim 1, wherein:
   the occupancy data comprises data flow information for the first physical location within a predetermined time period; and
   determining the current occupancy level comprises:
      determining a number of transactions within the predetermined time period based on the data flow information;
      comparing the number of transactions within the predetermined time period to a transaction threshold value, wherein the transaction threshold value corresponds with an average number of transactions for the first physical location; and
      determining the current occupancy level based at least in part on the comparison between the number of transactions within the predetermined time period and the transaction threshold value.

4. The device of claim 1, wherein:
   the occupancy status request further comprises a service identifier that identifies a service offered at the first physical location;
   the occupancy data comprises employee log-in records; and
   determining the current occupancy level comprises:
      determining a number of employees that are associated with the service offered at the first physical location based on the employee log-in records; and
      determining the current occupancy level based at least in part on the number of employees that are associated with the service offered at the first physical location.

5. The device of claim 1, wherein:
   the occupancy status request further comprises a time identifier that identifies a user-selected time;
   the occupancy data comprises staffing information, wherein the staffing information identifies a number of employees that will be present at the first physical location at different times; and
   determining the current occupancy level comprises:
      determining a number of employees that are present at the first physical location at the user-selected time based on the staffing information; and determining the current occupancy level based at least in part on the number of employees that are present at the first physical location at the user-selected time.

6. The device of claim 1, wherein:
the occupancy status request further comprises:
a service identifier that identifies a service offered at the first physical location; and
a time identifier that identifies a user-selected time;
the occupancy data comprises staffing information, wherein the staffing information identifies a number of employees that will be present at the first physical location at different times; and
determining the current occupancy level comprises:
determining a number of employees that are associated with the service offered at the first physical location at the user-selected time based on staffing information; and
determining the current occupancy level based at least in part on the number of employees that are associated with the service offered at the first physical location at the user-selected time.

7. The device of claim 1, wherein:
the occupancy status request further comprises a service identifier that identifies a service offered at the first physical location;
the occupancy data comprises staffing information, wherein the staffing information identifies a number of employees that will be present at the first physical location at different times; and
the processor is further configured to:
identify a future time;
determine a number of employees that are associated with the service offered at the first physical location at the future time based on staffing information;
determine a second occupancy level based at least in part on the number of employees that are associated with the service offered at the first physical location at the future time;
determine the second occupancy level is less than the current occupancy level; and
send a recommendation to the user device that identifies the future time in response to determining that the second occupancy level is less than the current occupancy level.

8. An occupancy prediction method, comprising:
receiving an occupancy status request from a user device, wherein the occupancy status request comprises a location identifier for a first physical location where services are provided;
identifying the first physical location that is associated with the location identifier;
identifying a local management system that is associated with the first physical location;
sending an occupancy information request to the local management system;
receiving occupancy data in response to sending the occupancy information request, wherein the occupancy data comprises one or more images of an interior space of the first physical location;
determining a current occupancy level for the first physical location based at least in part on a number of people present in the one or more images;
comparing the current occupancy level to an occupancy threshold value;
determining an occupancy status for the first physical location based on the comparison between the current occupancy level and the occupancy threshold value, wherein determining the occupancy status for the first physical location comprises:
determining to which occupancy class the current occupancy level belongs such that:
in response to determining that the current occupancy level is more than the occupancy threshold level, determining that the current occupancy level belongs to a first occupancy class; and
in response to determining that the current occupancy level is less than the occupancy threshold, determining that the current occupancy level belongs to a second occupancy class;
determining resource utilization employed at the physical location, wherein the resource comprises at least one of processing resources and network resources, wherein the resource utilization is proportional to the occupancy status such that:
when the occupancy status is less than the occupancy threshold level, the resource utilization is less than a resource utilization threshold; and
when the occupancy status is more than the occupancy threshold level, the resource utilization is more than the resource utilization threshold;
managing an amount of the resource to be employed at the physical location based at least in part upon the occupancy status such that:
when the occupancy status is less than the occupancy threshold level, the amount of resources is reduced; and
when the occupancy status is more than the occupancy threshold level, the amount of resources is increased; and
sending the occupancy status to the user device.

9. The method of claim 8, wherein:
the occupancy data comprises employee log-in records; and
determining the current occupancy level comprises:
determining a number of employees that are present at the first physical location based on the employee log-in records; and
subtracting the number of employees that are present at the first physical location from the number of people that are present in the one or more images.

10. The method of claim 8, wherein:
the occupancy data comprises data flow information for the first physical location within a predetermined time period; and
determining the current occupancy level comprises:
determining a number of transactions within the predetermined time period based on the data flow information;
comparing the number of transactions within the predetermined time period to a transaction threshold value, wherein the transaction threshold value corresponds with an average number of transactions for the first physical location; and
determining the current occupancy level based at least in part on the comparison between the number of transactions within the predetermined time period and the transaction threshold value.

11. The method of claim 8, wherein:
the occupancy status request further comprises a service identifier that identifies a service offered at the first physical location;
the occupancy data comprises employee log-in records; and
determining the current occupancy level comprises:

determining a number of employees that are associated with the service offered at the first physical location based on the employee log-in records; and
determining the current occupancy level based at least in part on the number of employees that are associated with the service offered at the first physical location.

12. The method of claim 8, wherein:
the occupancy status request further comprises a time identifier that identifies a user-selected time;
the occupancy data comprises staffing information, wherein the staffing information identifies a number of employees that will be present at the first physical location at different times; and
determining the current occupancy level comprises:
   determining a number of employees that are present at the first physical location at the user-selected time based on the staffing information; and
   determining the current occupancy level based at least in part on the number of employees that are present at the first physical location at the user-selected time.

13. The method of claim 8, wherein:
the occupancy status request further comprises:
   a service identifier that identifies a service offered at the first physical location; and
   a time identifier that identifies a user-selected time;
the occupancy data comprises staffing information, wherein the staffing information identifies a number of employees that will be present at the first physical location at different times; and
determining the current occupancy level comprises:
   determining a number of employees that are associated with the service offered at the first physical location at the user-selected time based on staffing information; and
   determining the current occupancy level based at least in part on the number of employees that are associated with the service offered at the first physical location at the user-selected time.

14. The method of claim 8, wherein:
the occupancy status request further comprises a service identifier that identifies a service offered at the first physical location;
the occupancy data comprises staffing information, wherein the staffing information identifies a number of employees that will be present at the first physical location at different times; and
further comprising:
   identifying a future time;
   determining a number of employees that are associated with the service offered at the first physical location at the future time based on staffing information;
   determining a second occupancy level based at least in part on the number of employees that are associated with the service offered at the first physical location at the future time;
   determining the second occupancy level is less than the current occupancy level; and
   sending a recommendation to the user device that identifies the future time in response to determining that the second occupancy level is less than the current occupancy level.

15. An occupancy tracking system, comprising:
a local management system comprising a camera system, wherein:
   the local management system is associated with a first physical location where services are provides; and
   the camera system is configured to captures images of at least a portion of the physical location; and
an occupancy tracking device comprising a processor configured to:
   receive an occupancy status request from a user device, wherein the occupancy status request comprises a location identifier for the first physical location;
   determine the first physical location is associated with the location identifier;
   identify the local management system that is associated with the first physical location;
   send an occupancy information request to the local management system;
   receive occupancy data in response to sending the occupancy information request, wherein the occupancy data comprises one or more images of an interior space of the first physical location;
   determine a current occupancy level for the first physical location based at least in part on a number of people present in the one or more images;
   compare the current occupancy level to an occupancy threshold value;
   determine an occupancy status for the first physical location based on the comparison between the current occupancy level and the occupancy threshold value, wherein determining the occupancy status for the first physical location comprises:
      determining to which occupancy class the current occupancy level belongs such that:
         in response to determining that the current occupancy level is more than the occupancy threshold level, determining that the current occupancy level belongs to a first occupancy class; and
         in response to determining that the current occupancy level is less than the occupancy threshold, determining that the current occupancy level belongs to a second occupancy class; and
   determine resource utilization employed at the physical location, wherein the resource comprises at least one of processing resources and network resources, wherein the resource utilization is proportional to the occupancy status such that:
      when the occupancy status is less than the occupancy threshold level, the resource utilization is less than a resource utilization threshold; and
      when the occupancy status is more than the occupancy threshold level, the resource utilization is more than the resource utilization threshold;
   manage an amount of the resource to be employed at the physical location based at least in part upon the occupancy status such that:
      when the occupancy status is less than the occupancy threshold level, the amount of resources is reduced; and
      when the occupancy status is more than the occupancy threshold level, the amount of resources is increased; and
   send the occupancy status to the user device.

16. The system of claim 15, wherein:
the occupancy data comprises employee log-in records; and
determining the current occupancy level comprises:
   determining a number of employees that are present at the first physical location based on the employee log-in records; and subtracting the number of employees that are present at the first physical location from the number of people that are present in the one or more images.

17. The system of claim 15, wherein:
the occupancy data comprises data flow information for the first physical location within a predetermined time period; and
determining the current occupancy level comprises:
- determining a number of transactions within the predetermined time period based on the data flow information;
- comparing the number of transactions within the predetermined time period to a transaction threshold value, wherein the transaction threshold value corresponds with an average number of transactions for the first physical location; and
- determining the current occupancy level based at least in part on the comparison between the number of transactions within the predetermined time period and the transaction threshold value.

18. The system of claim 15, wherein:
the occupancy status request further comprises a service identifier that identifies a service offered at the first physical location;
the occupancy data comprises employee log-in records; and
determining the current occupancy level comprises:
- determining a number of employees that are associated with the service offered at the first physical location based on the employee log-in records; and
- determining the current occupancy level based at least in part on the number of employees that are associated with the service offered at the first physical location.

19. The system of claim 15, wherein:
the occupancy status request further comprises a time identifier that identifies a user-selected time;
the occupancy data comprises staffing information, wherein the staffing information identifies a number of employees that will be present at the first physical location at different times; and
determining the current occupancy level comprises:
- determining a number of employees that are present at the first physical location at the user-selected time based on the staffing information; and
- determining the current occupancy level based at least in part on the number of employees that are present at the first physical location at the user-selected time.

20. The system of claim 15, wherein:
the occupancy status request further comprises:
- a service identifier that identifies a service offered at the first physical location; and
- a time identifier that identifies a user-selected time;
the occupancy data comprises staffing information, wherein the staffing information identifies a number of employees that will be present at the first physical location at different times; and
determining the current occupancy level comprises:
- determining a number of employees that are associated with the service offered at the first physical location at the user-selected time based on staffing information; and
- determining the current occupancy level based at least in part on the number of employees that are associated with the service offered at the first physical location at the user-selected time.

* * * * *